United States Patent [19]
Arrowsmith et al.

[11] Patent Number: 5,641,337
[45] Date of Patent: Jun. 24, 1997

[54] PROCESS FOR THE DEHYDRATION OF A GAS

[75] Inventors: Robert J. Arrowsmith; Kenneth Jones, both of Chesterfield, Mo.

[73] Assignee: Permea, Inc., St. Louis, Mo.

[21] Appl. No.: 569,533

[22] Filed: Dec. 8, 1995

[51] Int. Cl.⁶ .................................................. B01D 53/22
[52] U.S. Cl. ........................................... 95/39; 95/52
[58] Field of Search ............................... 95/45, 47–55, 95/39

[56] References Cited

U.S. PATENT DOCUMENTS

| | | | |
|---|---|---|---|
| 3,735,558 | 5/1973 | Skarstrom et al. | 95/51 |
| 4,497,640 | 2/1985 | Fournié et al. | 95/52 X |
| 4,718,921 | 1/1988 | Makino et al. | 95/52 |
| 4,931,070 | 6/1990 | Prasad | 95/52 |
| 5,004,482 | 4/1991 | Haas et al. | 95/52 |
| 5,034,025 | 7/1991 | Overmann, III | 95/52 |
| 5,084,073 | 1/1992 | Prasad | 95/52 |
| 5,169,412 | 12/1992 | Prasad et al. | 95/52 X |
| 5,205,842 | 4/1993 | Prasad | 95/52 X |
| 5,226,932 | 7/1993 | Prasad | 95/45 |
| 5,240,472 | 8/1993 | Sircar | 95/52 |
| 5,259,869 | 11/1993 | Auvil et al. | 95/52 |
| 5,282,969 | 2/1994 | Xu | 95/45 X |
| 5,378,263 | 1/1995 | Prasad | 95/45 X |
| 5,383,956 | 1/1995 | Prasad et al. | 95/52 X |
| 5,411,662 | 5/1995 | Nicholas, Jr. et al. | 210/321.8 |
| 5,482,539 | 1/1996 | Callahan | 95/45 X |

FOREIGN PATENT DOCUMENTS

| | | | |
|---|---|---|---|
| 0430304 | 6/1991 | European Pat. Off. | 95/52 |
| 0537599 | 4/1993 | European Pat. Off. | |
| 0596268 | 5/1994 | European Pat. Off. | 95/47 |

*Primary Examiner*—Robert Spitzer
*Attorney, Agent, or Firm*—Mark L. Rodgers; William F. Marsh

[57] ABSTRACT

The present invention relates to a process for the dehydration of a gas, particularly of a gas where the gas values should all be substantially recovered as dehydrated gas. The process uses membrane dryers and provides a sweep gas for each of the dryers. The sweep gas is substantially recovered and used again as a sweep gas. The process is economical and can process large quantities of gas.

14 Claims, 2 Drawing Sheets

PROCESS FOR THE DEHYDRATION OF A GAS

BACKGROUND OF THE INVENTION

The present invention relates to the dehydration of a gas containing moisture. The process for dehydration of a gas according to the present invention recovers substantially all of the gas in a dry form.

There are a variety of gases from which it is desirable to remove water vapor. The present invention relates particularly to those gases wherein it is highly desirable to recover substantially all of the gas from the dehydration process. The particular gases to which the present invention relates include air, natural gas, nitrogen, methane, carbon dioxide, carbon monoxide and hydrogen, and certain other hydrocarbon gases such as ethane, ethylene, propane, propylene, and the like. Frequently these gases will contain relatively small amounts of moisture in the form of water vapor, but it is still desirable to further dehydrate the gas removing at least about 95% of the moisture present.

The presence of water vapor in these gases can cause problems such as corrosion if the gas also contains carbon dioxide or hydrogen sulfide. It is necessary to reduce the presence of water vapor to a very small amount when transporting the gas or subjecting the gas to subsequent processing e.g., liquefaction or marketing. Reducing moisture in hydrocarbon containing gases is important to eliminate the risk of forming solid deposits of hydrate complexes.

Processes used currently include cooling, contact with glycol, adsorption using silica gels and adsorption using molecular sieves. These processes require very large installations and therefore drive the cost of the process substantially upward. When drying a gas such as natural gas, which is generally piped directly from the gas field to the user, diversion through a batch-type process is expensive and time consuming.

The use of permeable membranes to separate the water vapor from a gas is considered a passive system in that the flow of the gas continues uninterrupted and the system is automated and requires little, if any, tending by personnel. In addition, a membrane system is adaptable to fields, sea platforms and in-plant settings. However, even with the simplicity of membrane systems, it is important to recover substantially all of the gas as gas almost devoid of moisture.

For example, patents relating to dehydration of natural gas by use of membrane systems include U.S. Pat. Nos. 3,735,558 to Skarstrom, et al.; 4,497,640 to Fournie, et al.; and 4,718,921 to Ube Industries. Whereas these patents provide membranes and systems for dehydration of gases, each of the patents sends a significant portion of the gas to waste.

The present invention provides a process for the dehydration of a gas wherein the moisture content is reduced almost entirely while simultaneously recovering substantially all of the gas, the gas being all gas components except water vapor.

SUMMARY OF THE INVENTION

The present invention provides a process for the dehydration of a gas containing moisture in the form of water vapor and recovering at least about 98% of the gas in the form of a substantially dry gas. For purposes of discussion herein, the term "gas" includes all gas components but moisture, i.e., water vapor, is excluded. The process comprises first contacting the gas under pressure with one side of a membrane in a primary membrane dryer under conditions suitable for the permeation of a major portion of the water vapor to a second side of the membrane. Thus a first permeate gas is provided at 0–60 psig containing the major portion of water vapor and any sweep gas provided, and a first non-permeate gas is also provided containing at least about 98% of the gas but only a minute portion of water vapor.

The first permeate gas is then compressed to increase its pressure in the range of about 50 psi to about 150 psi and the water is removed from at least a portion of the compressed gas. The water removal is effected by either cooling the compressed gas and condensing the water vapor to form liquid water and removing the liquid water, or by removing a portion of the compressed gas containing a substantial portion of the water vapor from the process. A combination of the water removal processes may also be used wherein water vapor is condensed and removed as water and then a portion of the compressed gas is removed which portion includes some remaining water vapor and a minute quantity of gas.

At least part of the compressed first permeate gas (after water removal) is utilized as feed to a second membrane dryer to obtain a second permeate gas (containing any sweep gas provided) and a second non-permeate gas. The second non-permeate gas is divided into a first sweep gas for the permeate side of the first membrane dryer and a second sweep gas for the permeate side of the second membrane dryer. The first non-permeate gas is recovered as a substantially dry gas containing at least 98% of the gas from the original feed gas.

In one embodiment of the present invention, the second permeate is mixed with the first permeate and hence any gas in the second permeate may be recovered. This process may be called a "closed" process wherein the first and second permeates (each containing any sweep provided) are combined, compressed, dewatered and used as feed to the second membrane dryer. However, in this closed process it may be necessary to purge the system slightly to remove excess gas which tends to build up in the closed portion of the process involving the second membrane dryer. At the point in the process where the second permeate is obtained, however, the gas in that permeate is a very small quantity and in any event will not exceed the quantity of gas in the first permeate (excluding any sweep gas). Consequently, the closed process still permits the recovery of more than 98% of the original feed gas excluding moisture, in a substantially dry form.

As previously stated, the dry gas product is the non-permeate gas obtained from the first dryer. Because the first dryer is provided with a dry gas sweep, the product gas is very dry even though it has passed only through one dryer. Almost all of the water vapor in the original gas passes through the membrane to the permeate side of the first membrane dryer whereupon it is joined by the dry sweep gas to form the first permeate. The first permeate, or a combination of the first and the second permeates provide the gas for the feed to the second dryer. The gas portion of each of the permeates is relatively small. Consequently, it is necessary to add gas to the feed for the second dryer at start-up so that the non-permeate stream from the second dryer has sufficient gas to provide the two sweep streams to the first and second dryers. Once the system is in operation, additional gas is not needed because the sweep gas from the sweep streams is recovered and reused as feed for the second dryer.

As heretofore stated the amount of gas permeating in the first dryer is very small, however even that small amount can create a buildup of gas in the closed cycle involving the second membrane dryer. Hence, it is necessary to remove excess gas from the closed cycle in an amount not exceeding the amount of gas which transfers from the feed side to the permeate side of the first membrane dryer. Methods for removal of excess gas are discussed later.

DETAILED DESCRIPTION OF THE INVENTION

Figure 1:
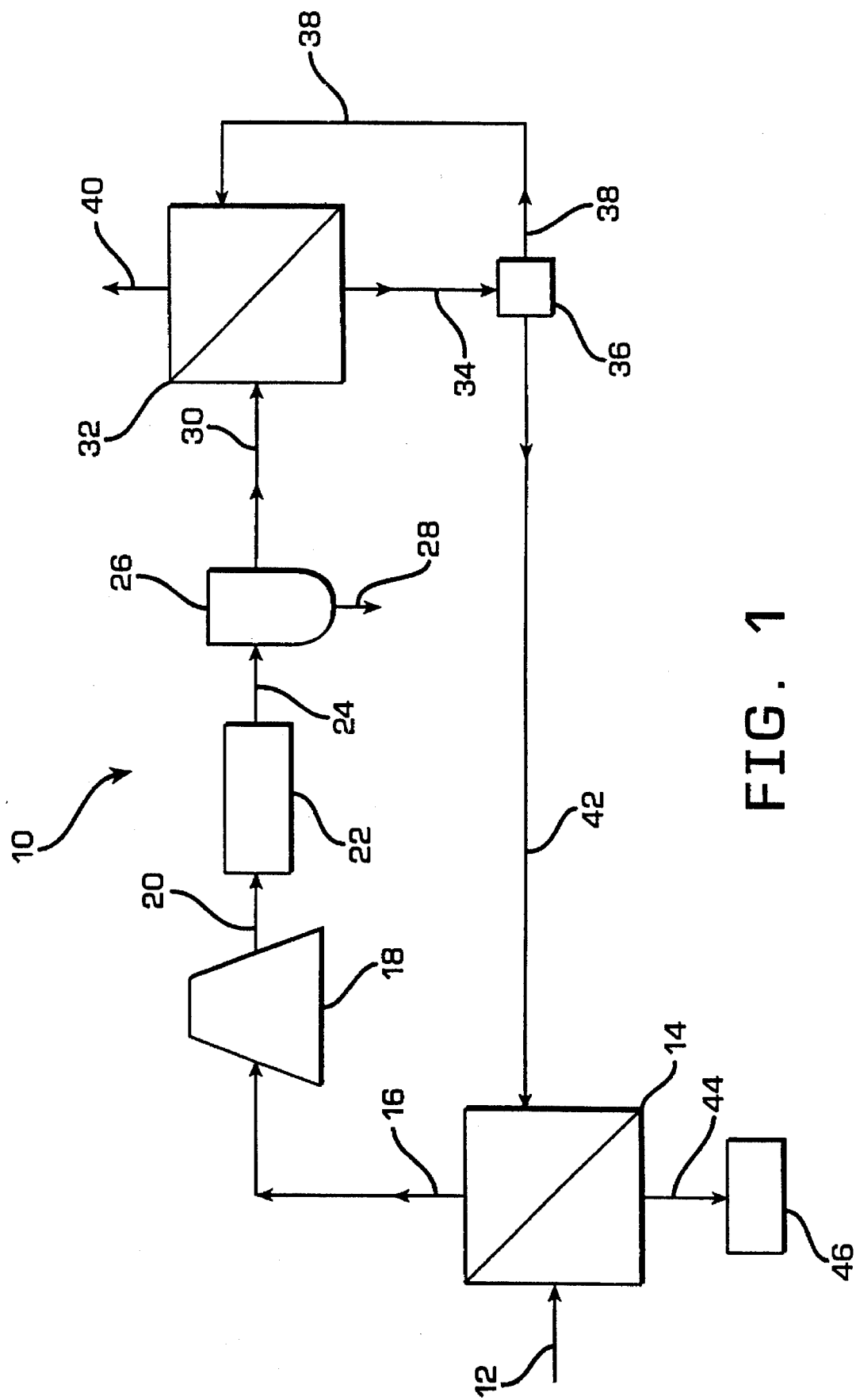
FIG. 1 is a schematic of one embodiment of the present invention.

FIG. 1 depicts a process 10 for the dehydration of a gas 12. The gas most generally will contain moisture up to but not exceeding saturation of water vapor, but it is desirable that the gas be dried to a moisture content of less than about 150 ppm. The gas 12 is under a pressure of at least about 250 psig and is contacted with a first membrane dryer 14 wherein the gas contacts one side of the membrane whereupon the moisture as water vapor passes through the membrane to a permeate side resulting in a permeate stream 16 at a pressure in the range of 0–60 psig. The non-permeate portion is a dried gas 44 having a moisture content of less than about 150 ppm. The dried gas is discharged from the process for use or it may be stored in a storage area 46. The permeate gas 16 is passed to a compressor 18 whereupon the pressure is raised by at least 50 psi. The compressed gas 20 is then passed to a cooler 22 in which the gas is cooled. The cooled compressed gas 24 is then passed to a water separation device 26 whereupon any moisture which condenses is removed as liquid water 28. The dewatered compressed gas 30 is feed for a second membrane dryer 32 which provides a permeate gas 40 which contains a small portion of the original gas but most of the moisture. The permeate 40 is either sent to waste or is recovered for other purposes. The non-permeate gas 34 in a substantially dry state is sent to a splitter valve 36 or other means of dividing the stream, whereupon the non-permeate gas 34 is divided into two parts, the first part 42 being sent to the first membrane dryer 14 to serve as a sweep, ideally countercurrent, on the permeate side of the membrane for the first dryer 14. The second portion 38 of the non-permeate gas 34 is sent to the second membrane dryer 32 and acts as a sweep, ideally countercurrent, for the permeate side of the second membrane dryer.

The feed side of the first membrane dryer 14 is operated at a pressure of at least about 250 psig whereas the second membrane dryer 32 is operated at a lower pressure of at least about 50 psig. Consequently, the amount of non-permeate sweep 34 sent to the second membrane dryer 32 is relatively low. Most of the non-permeate product 34 from the second membrane dryer 32 is sent through the splitter 36 as substantially dry gas 42 to operate as the sweep for the permeate side of the first membrane dryer 14. In any event, the gas 40 is a very moist gas which is removed from the system 10 and does not exceed the amount of gas which permeates from the feed side to the permeate side of the first membrane dryer. Depending on the rate of gas permeation in the first dryer, the gas that is lost through the permeate 40 is typically less than 2% and most generally less than 1% of the gas originally entering the process at the first membrane dryer 14. However, since it is necessary to have non-permeate gas from the second membrane dryer to serve as countercurrent sweep for both dryers, gas needs to be available within the sweep part of the process so as to provide adequate sweep. This gas can be placed in the system at start-up by priming the second membrane dryer with original feed gas or by priming the secondary dryer using some other source of gas which is compatible.

Figure 2:
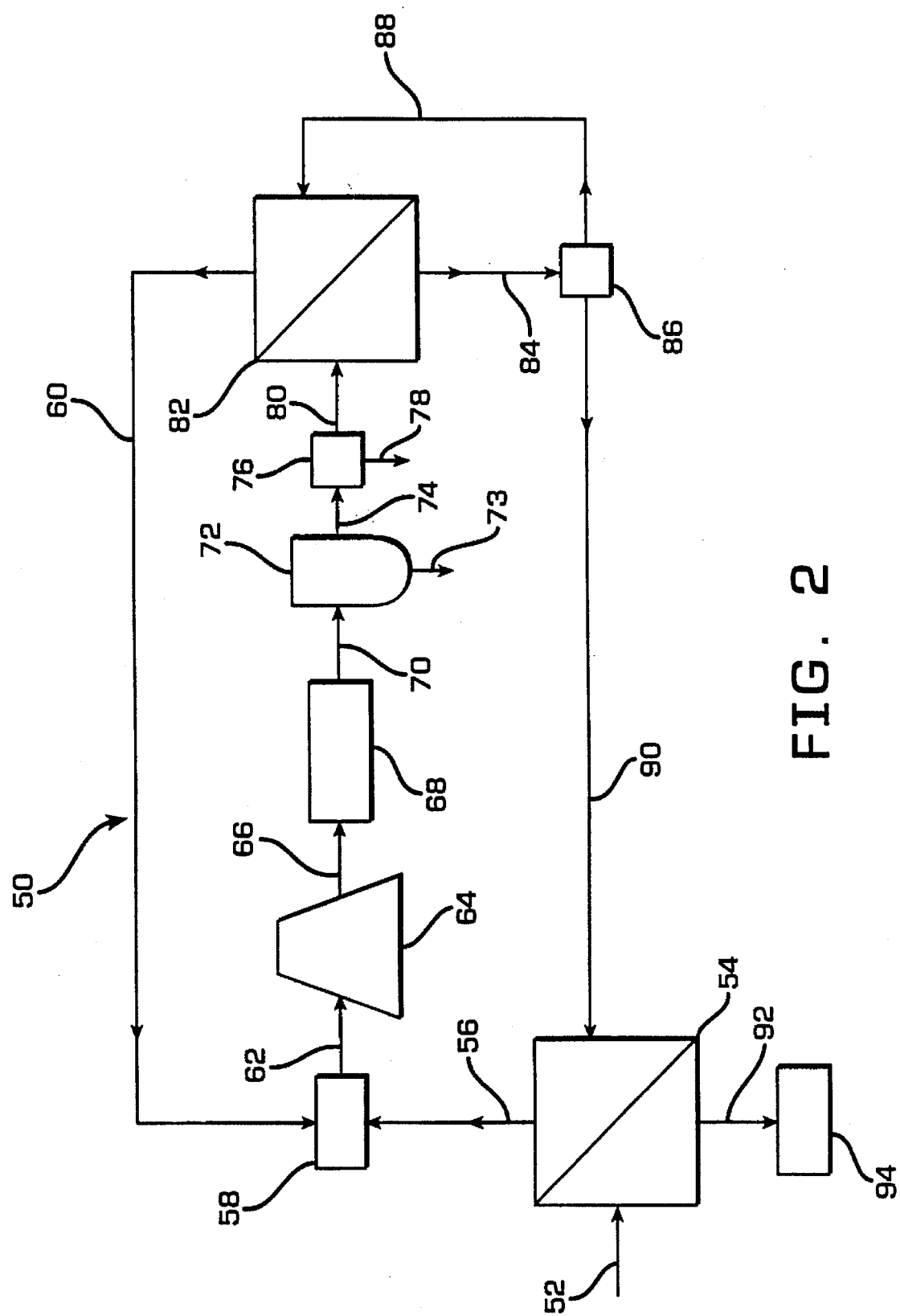
FIG. 2 is a schematic of another embodiment of the present invention.

FIG. 2 depicts another process 50 covering another embodiment of the present invention. A gas 52 containing moisture in the form of water vapor up to but not exceeding saturation, is fed under pressure to one side of the membrane in the membrane dryer 54 and is separated to provide a substantially dry non-permeate 92 and a moist permeate 56. The substantially dry permeate 92 contains less than about 150 ppm of moisture and may be discharged from the process for use or may be stored in a storage area 94. The wet gas 56 at a pressure of 0–60 psig is passed to a mixing valve 58 or other device which mixes it with the moist permeate 60 from a second membrane dryer 32. The mixed permeate 62 is passed to a compressor 64 whereupon the pressure is increased by at least 50 psi. The compressed gas 66 is passed to a cooler 68 so as to condense moisture and a cooled compressed gas 70 is passed to a device 72 for separating liquid water from the moist gas 70 whereupon the water 73 is removed and the dewatered compressed gas 74 is sent to a purge splitter 76. The purge stream 78 leaving the splitter removes a small portion of the gas in order to remove excess gas from the system. The purged dewatered compressed gas 80 is contacted with one side of the membrane in a second membrane dryer 82 whereupon a permeate 60 is formed. The permeate 60 is mixed with the permeate 56 from the first membrane dryer 54 and the mixed permeate 62 is compressed, cooled, dewatered and purged as above. The non-permeate 84 from the membrane dryer 82 is sent to a splitter 86 whereupon a portion 88 is sent to the second membrane dryer 82 as a sweep, ideally countercurrent, of the permeate side of the membrane and the balance 90 is sent to the first membrane dryer 54 as a sweep, ideally countercurrent of the permeate side of the membrane.

Although the present invention generally is applicable for dehydration of gases, it is particularly suitable for dehydration of gases which have value. For instance, a nitrogen gas which is required to have a high degree of dehydration can have its moisture content reduced to less than 40 parts per million. It is also highly desirable to remove substantially all of the moisture from a gas such as natural gas while simultaneously retaining substantially all of the gas. Other gases for which the present invention is suitable include ethane, ethylene, propane, propylene, butane, butene, carbon dioxide, carbon monoxide and hydrogen and the like. For example, natural gas as it is first recovered, may contain gas components as set forth in Table 1 below.

TABLE 1

| Gas Component | Concentration in Mole % |
| --- | --- |
| Methane | 94.28 |
| Nitrogen | 0.94 |
| Carbon dioxide | 0.63 |
| Ethane | 3.19 |
| Propane | 0.53 |
| Isobutane | 0.09 |
| N-Butane | 0.11 |
| $C_5-C_8$ | 0.23 |

In addition to these components, the gas will contain moisture (water vapor) in an amount from about 500 to about 2000 ppm depending on temperature and pressure. Even though it appears the moisture content is quite low, it is sufficient to create solid ice-like materials called hydrates and, in combination with acid gas components may cause corrosion in piping, valves and product end-use mechanisms. In order to prevent hydrate formation and corrosion in use, it is desirable to reduce the water content to less than 150 ppm, preferably less than 50 ppm, while at the same time recovering in excess of 98% of the gas.

Any dehydration process should be continuous, economical and effective for reducing the water content substantially while preserving the gas.

The present invention utilizes membranes which will separate the gas components from the water vapor. Although it is known in the art to use membranes to reduce the water content of a gas, the prior art has not provided a process which will reduce the water content to less than 150 ppm while simultaneously preserving in excess of 98% of the gas.

The present invention provides such a process by utilization of two membrane dryers. The first or primary membrane dryer utilizes a highly selective membrane having very low porosity such that the water permeates readily but very little of the gas permeates. Since the water content is low and very little of the gas values permeate, there is very little flow on the permeate side of the membrane. As a result, it is necessary to provide a gas sweep on the permeate side of the membrane otherwise water partial pressure builds up and diminishes the driving force for continuous transport of the water across the wall of the membrane.

Traditionally, the sweep gas for the permeate side of a membrane includes at least a portion of the dried product gas. The sweep gas, generally, is lost or the recovery is expensive. The present invention provides an efficient sweep gas for the permeate side of the primary membrane dryer without loss of a substantial portion of the gas by a process which is economically feasible.

A second membrane dryer is utilized in the process of the present invention. The membranes used in this second dryer are no more selective and may be less selective than the membranes of the first membrane dryer but still allow very rapid transport of the moisture from the gas while supplying a dry gas which can be used primarily as a sweep for the primary membrane dryer. The permeate gas stream from the primary membrane provides part of the feed for the secondary membrane. However, prior to the primary permeate being utilized as feed for the secondary membrane, the permeate is dewatered. First of all, the permeate is not under sufficient pressure so a compressor is used to compress the first permeate gas after which a cooler and a liquid water separation device may be used to substantially remove water from the compressed permeate. The compressed first permeate may not provide sufficient feed for the second dryer at start-up of the process. It may be necessary to prime the feed gas for the secondary dryer to provide sufficient initial feed gas for the dryer. The secondary dryer provides a non-permeate gas which is substantially dry and a permeate containing small quantities of the original gas and a relatively large amount of its original moisture. The secondary non-permeate is divided into a sweep for the primary dryer and a small amount of sweep for the secondary dryer. Thus the major portion of the non-permeate gas from the secondary dryer when used as a sweep for the permeate side of the primary dryer becomes part of a substantially closed loop whereby that sweep gas is recovered along with the permeate from the primary dryer and is processed through the dewatering process followed by use as a feed gas for the secondary dryer.

Even though the permeate from the secondary dryer is small in quantity, it may be desirable to return it to the system by combining it with the permeate from the primary dryer after which the mixed permeate is subjected to dewatering and is then used as the feed gas for the secondary dryer.

If the second permeate rather than being discharged as waste or sent to another process, is mixed with the first permeate and hence recycled into the process, gas can build up in the system and it will be found necessary to purge the excess gas. This occurs because a small quantity of gas permeates through the membrane walls of the primary membrane dryer. That permeate then enters the substantially "closed" loop which provides the dry sweep gas for the primary membrane dryer. Purging of this small quantity of excess gas can occur with the dewatering process or can occur by sending the second membrane dryer permeate to waste or another process, or by simply purging the excess gas from the process at any to a desirable point. Once adequate gas is in the "closed" loop to provide the necessary sweep to the permeate side of the primary dryer, it is not necessary to prime the system or to expressly add further gas.

Under continuous operating conditions, the required amount of gas to be purged should be substantially equal to the amount of gas which passes through the first membrane into the first membrane dryer permeate. A simple means of keeping the gas content of the sweep streams consistent is to monitor the amount of gas in the first permeate stream and purge a like amount from somewhere in the sweep gas loop. In FIG. 1, the gas purge takes place at the second permeate stream 40. In this instance, the amount of purge necessary would be set by the permeability constants of the membrane of the first dryer. In FIG. 2. The purge of excess gas takes place at the purge splitter 76 where the purge 78 leaves the process. The purge splitter 76 would be controlled to respond to the amount of gas which permeates through the membrane in the first membrane dryer 54. The excess gas can be purged from any satisfactory location within the sweep gas loop. In fact, it may be found desirable to purge gas from more than one location. The amount of gas purged is essentially the only loss of gas in the process. Generally the amount of gas in the purge is less than 2% and frequently, less than 1% of the original gas to be processed.

The membrane of the second dryer may be somewhat less selective and will operate to provide the necessary non-permeate substantially dry gas stream under a lot less pressure than the primary dryer. Because the proportion of gas to moisture in the original feed gas is very high, it is desirable to provide the first membrane dryer with a substantially non-porous membrane having a relatively high selectivity for water/gas. Utilizing a membrane material with a high selectivity factor allows substantially all of the gas to remain on the non-permeate side whereas substantially all of the water is transported to the permeate side. In order to effect this kind of separation, it is desirable to use a relatively high feed pressure.

However, in the instance of the secondary membrane, such a high feed pressure is not needed because the quantity of gas in the feed is relatively small and this gas will be substantially recovered in the process as discussed above.

The amount of moisture in the original gas which can be removed in the present process is up to saturation at the temperature and pressure of the gas as it enters the first membrane dryer. Examples of saturated water content for natural gas as a function of temperature and pressure are as follows:

| Pressure (psia) | Temperature (°F.) | Water (ppm) |
| --- | --- | --- |
| 600 | 68 | 735 |
| 600 | 82 | 1050 |
| 1000 | 81 | 735 |
| 1000 | 94 | 1050 |
| 1000 | 110 | 1680 |

In all instances, the ppm of water is expressed as parts per million by volume.

The permeability of a given gas can be expressed as the volume of gas at standard temperature and pressure, (STP) which passes through a membrane per square centimeter of surface area, per second, for a partial pressure drop of 1 centimeter of mercury (cmHg) across the membrane per unit of thickness, and is expressed as P/I=cm$^3$/cm$^2$·sec·cmHg. The suggested range of P/I for water vapor, for example, at 20° C. for membranes used in the primary dryer in the present invention is from about 50×10$^{-6}$ cm$^3$/cm$^2$·sec·cmHg to about 5,000×10$^{-6}$ cm$^3$/cm$^2$·sec·cmHg although there is no upper limit. It is preferable that the membrane have a P/I greater than about 200×10$^{-6}$ cm$^3$/cm$^2$·sec·cmHg. The preferred selectivity of the first membrane for water vapor/gas is greater than about 100. For the second membrane, the preferred selectivity is greater than about 25.

It is suggested that the membrane be made from hydrophobic polymers. The polymeric membrane material may be selected from substituted or unsubstituted polysulfone, polystyrene, acrylonitrile-styrene copolymer, styrene-butadiene copolymer, styrene-vinylbenzylhalide copolymer, polycarbonate, cellulose acetate, cellulose propionate, ethyl cellulose, methyl cellulose, nitrocellulose, polyamide, polyimide, aryl polyamide, aryl polyimide, polyether, polyetherimide, polyarylene oxide, polyphenylene oxide, polyxylylene oxide, polyesteramide-diisocyanate, polyurethane, polyester, polyarylate, polyethylene terephthalate, polyalkyl methacrylate, polyalkyl acrylate, polyphenylene terephthalate, polysulfide, polysiloxane, polyethylene, polypropylene, polybutene-1, poly-4-methyl pentene-1, polyvinyl chloride, polyvinyl fluoride, polyvinylidene chloride, polyvinylidene fluoride, polyvinyl alcohol, polyvinyl acetate, polyvinyl propionate, polyvinyl pyridine, polyvinyl pyrrolidone, polyvinyl ether, polyvinyl ketone, polyvinyl aldehyde, polyvinyl formal, polyvinyl butyral, polyvinyl amine, polyvinyl phosphate, polyvinyl sulfate, polyacetal, polyallyl, polybenzobenzimidazole, polyhydrazide, polyoxadiazole, polytriazole, polybenzimidazole, polycarbodiimide, polyphosphazine, polypropylene oxide, and interpolymers, block interpolymers, copolymers, block copolymers, grafts and blends of the foregoing as well as other suitable materials.

PRIOR ART EXAMPLE

A control test is carried out wherein methane gas at a pressure of 1000 psig, containing 1000 ppm (volume basis) of water is fed to the shell side of a hollow fiber membrane dryer to produce a non-permeate dry gas containing 42 ppm of water and a permeate containing the remainder of the water. The non-permeate is removed from the process as dried product gas at 42 ppm of water. The permeate is purged from the process. The dryer uses a membrane with a water permeability of 1000×10$^{-6}$ cm$^3$/cm$^2$·sec·cmHg. The calculated performance of the process is given in Table 2 below:

TABLE 2

| Control No. | Methane Permeability (cm$^3$/cm$^2$·sec·cmHg) | Permeate Flow Gas Loss (% of Feed) | Area sq ft/ lb mole/hr of Feed |
| --- | --- | --- | --- |
| A | 3.58 × 10$^{-6}$ | 4.0 | 6.57 |
| B | 2.51 × 10$^{-6}$ | 3.5 | 8.26 |
| C | 1.49 × 10$^{-6}$ | 3.0 | 11.96 |

EXAMPLE 1

Both a primary membrane dryer and a secondary membrane dryer are used in a process according to the present invention to dry methane containing about 1000 ppm of water vapor. Each of the primary and secondary dryers use membranes having a water permeability of 1000×10$^{-6}$ cm$^3$/cm$^2$·sec·cmHg and a methane permeability of 2×10$^{-6}$ cm$^3$/cm$^2$·sec·cmHg under the operating conditions discussed hereinafter. Each dryer is operated with a sweep stream on the permeate side of the membrane to assist the continuing transfer of water across the membrane.

Methane at 1000 psig and at 100° F. is fed to the shell side of the primary dryer containing hollow fiber membranes of the above description, A non-permeate gas stream is obtained under a pressure of 997 psig containing 42 ppm of water and a permeate stream is obtained at a pressure of about 5.3 psig containing the remainder of the water. The non-permeate stream is removed from the system as dried methane containing only 42 ppm of water.

The stream leaving the permeate side of the primary dryer is a combination of the permeate and the sweep. This stream is combined with the stream leaving the permeate side of the secondary dryer, and the combined streams are compressed, cooled to 100° F. and fed to a separating device that separates the condensed liquid water from the stream and removes the water from the process. The gaseous stream leaves the water separation step at a pressure of about 5 psi below the pressure of the stream as it left the compressor. The stream is divided into two parts. One part is a small purge stream containing substantially the same amount of gas as is passed through the first membrane dryer into the permeate, the purge leaving the process and the other part is the feed stream for the secondary membrane dryer. This feed stream is fed to the bores of the hollow fibers in the secondary dryer.

The secondary dryer produces a non-permeate stream at a pressure of about 6 psi lower than the compressor exit pressure but containing less water than the feed stream, and a permeate stream at about 5.3 psig containing more water than the feed. The permeate stream is combined with the permeate stream from the primary dryer and fed to the compressor. The non-permeate stream is expanded to a lower pressure, reheated to 100° F., and divided into two streams, one used to sweep the permeate side of the primary dryer and the other used to sweep the permeate side of the secondary dryer.

The calculated performance of the process is presented in Table 3 below wherein the moisture content of the gas is lowered to 42 ppm.

TABLE 3

| Primary Dryer | Sweep | Secondary Dryer | Gas | 1st & 2nd Dryer |
| --- | --- | --- | --- | --- |

| Sample No. | Sweep Flow (% Feed) | Water Content (ppm) | Sweep Flow (% Feed) | Purged (% Feed) Gas Loss | Area (sq ft/ Lb mole/Hr of Feed) |
|---|---|---|---|---|---|
| 1a | 4.0 | 300 | 1.95 | 1.01 | 4.0 |
| 1b | 5.0 | 300 | 1.94 | 0.91 | 3.9 |
| 1c | 6.0 | 300 | 1.93 | 0.86 | 4.1 |
| 1d | 7.0 | 300 | 1.91 | 0.83 | 4.4 |
| 1e | 5.0 | 200 | 1.93 | 0.90 | 4.1 |
| 1f | 5.0 | 400 | 1.95 | 0.94 | 3.9 |
| 1g | 4.0 | 300 | 0.95 | 1.01 | 4.2 |
| 1h | 5.0 | 300 | 0.91 | 0.91 | 4.6 |
| 1i | 5.0 | 300 | 2.94 | 0.91 | 3.9 |
| 1j | 5.0 | 300 | 1.91 | 0.91 | 5.6 |
| 1k | 4.0 | 300 | 1.94 | 1.01 | 5.1 |

The 1st & 2nd dryer area shows how many square feet of membrane area is required to obtain the result based on a pound mole per hour of flow of the original gas.

When comparing the results in Table 3 with those from Table 2, it is apparent that the process of the present invention in Example 1 is much improved over that of the prior art example. The gas loss is less than ⅓ that of the prior art process and the process of the present invention requires ⅓ as much membrane area as does the prior art process. Therefore the present invention is very economical, simple and efficient as compared to conventional membrane processes.

We claim:

1. A process for the dehydration of a gas containing water vapor up to but not exceeding saturation to obtain a gas having less than about 150 ppm by volume of water vapor, the process comprising:
    (a) contacting the gas under pressure with one side of a membrane in a primary membrane dryer under conditions suitable for the permeation of a major portion of the water vapor to a second side of the membrane to provide a first low pressure permeate gas containing the major portion of water vapor and a first non-permeate gas containing less than about 150 ppm of water vapor;
    (b) compressing at least a portion of the first permeate gas to increase the pressure by at least about 50 psi, removing water from at least a portion of the compressed gas (1) by condensing the compressed gas to form liquid water and removing the liquid water or (2) by removing a purge portion of the compressed gas containing a substantial portion of water vapor from the process or (3) by using a combination of (1) and (2), and using at least part of the compressed gas as feed to a second membrane dryer to obtain a second permeate gas and a second non-permeate gas;
    (c) dividing the second non-permeate gas into a first sweep gas for the permeate side of the first membrane dryer and a second sweep gas for the permeate side of the second membrane dryer; and
    (d) recovering the first non-permeate gas as a substantially dry gas having less than about 150 ppm of moisture and containing at least 98% of the gas.

2. The process of claim 1 wherein the gas is comprised of natural gas, nitrogen, air, a hydrocarbon gas or a mixture thereof.

3. The process of claim 1 wherein the gas containing water vapor contains less than about 1% water vapor by volume.

4. The process of claim 1 wherein the gas is natural gas and the first non-permeate is dry natural gas containing less than about 150 ppm of moisture.

5. The process of claim 4 wherein the dry natural gas contains less than 50 ppm of moisture.

6. The process of claim 1 wherein the water as vapor is removed in a purge portion, the purge portion containing gas in an amount substantially equal to the gas contained in the first permeate gas, excluding any sweep gas.

7. The process of claim 1 wherein a predetermined portion of a compatible gas is added to the feed to the second membrane dryer at start-up of the process.

8. A process for the dehydration of a hydrocarbon-containing gas containing less than 1% by volume of moisture to obtain a gas having less than 150 ppm of moisture, the process comprising:
    (a) contacting the gas under pressure with one side of a membrane in a primary membrane dryer under conditions suitable for the permeation of a major portion of the moisture as water vapor to a second side of the membrane to provide a first low pressure permeate gas including a first permeate sweep gas, containing the major portion of water vapor and a first non-permeate gas containing less than 150 ppm of water vapor;
    (b) mixing the first permeate gas with a second permeate gas obtained from a second membrane dryer to provide a mixed gas;
    (c) compressing the mixed gas to increase the pressure by at least about 50 psi;
    (d) removing water from at least a portion of the compressed mixed gas (1) by condensing the compressed mixed gas to form liquid water and removing the liquid water or (2) by removing a portion of the compressed mixed gas containing a substantial portion of water vapor from the process or (3) by using a combination of (1) and (2);
    (e) using at least part of the compressed mixed gas as feed to the second membrane dryer to obtain the second permeate gas and a second non-permeate gas;
    (f) dividing the second non-permeate gas into the first permeate sweep gas for the permeate side of the first membrane dryer and a second sweep gas for the permeate side of the second membrane dryer; and
    (g) recovering the first non-permeate gas as a substantially dry gas having less than about 150 ppm of moisture and containing at least 98% of the hydrocarbon-containing gas.

9. The process of claim 8 wherein the hydrocarbon-containing gas is natural gas.

10. The process of claim 9 wherein the first non-permeate gas contains less than about 50 ppm of moisture.

11. A process for the dehydration of natural gas containing moisture utilizing a higher pressure primary membrane dryer stage and a lower pressure secondary membrane dryer stage to recover at least 98% of the gas as substantially dry natural gas, the process comprising:
    (a) contacting natural gas under pressure and containing water vapor with one side of a membrane in a higher pressure primary membrane dryer under conditions suitable for the permeation of a major portion of the water vapor to a second side of the membrane to provide a first permeate containing a major portion of the water vapor and a first non-permeate having a major portion of the water vapor removed;
    (b) contacting a feed gas under pressure and containing water vapor with one side of a membrane in a lower pressure secondary membrane dryer under conditions suitable for the permeation of a major portion of the water vapor to a second side of the membrane to provide a second permeate containing a major portion of the water vapor and a second non-permeate having a major portion of the water vapor removed;

(c) compressing at least part of the first permeate including any sweep gas and the second permeate including any sweep gas to at least 50 psig and using at least part of the resulting compressed gas as the feed gas to the secondary membrane dryer;

(d) using a major part of the second non-permeate to sweep the permeate side of the primary membrane dryer;

(e) using a minor part of the second non-permeate to sweep the permeate side of the secondary membrane dryer; and (f) recovering the non-permeate of the primary membrane dryer as dehydrated natural gas.

12. The process of claim 11 wherein the natural gas before dehydration contained about 1000 ppm of moisture and after dehydration contained less than 50 ppm of moisture.

13. The process of claim 11 wherein the membrane dryers contain hollow fiber membranes.

14. The process of claim 13 wherein the hollow fiber membranes are polymers selected from the group consisting of polysulfone and polyetherimide polymers.

* * * * *